United States Patent
Fernsler et al.

(10) Patent No.: US 6,690,124 B2
(45) Date of Patent: Feb. 10, 2004

(54) DYNAMIC FOCUS AMPLIFIER OUTPUT WITH STEP-UP AUTOTRANSFORMER

(75) Inventors: Ronald Eugene Fernsler, Indianapolis, IN (US); Robert Joseph Gries, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 26 days.

(21) Appl. No.: 10/007,160

(22) Filed: Dec. 5, 2001

(65) Prior Publication Data

US 2003/0102826 A1 Jun. 5, 2003

(51) Int. Cl.$^7$ ................................................ G09G 1/04
(52) U.S. Cl. ...................... 315/382; 315/382.1; 315/410
(58) Field of Search ................... 315/382, 382.1, 315/364, 368.15, 368.18, 368.21, 368.22, 368.23, 405, 403, 410

(56) References Cited

U.S. PATENT DOCUMENTS

| | | | | |
|---|---|---|---|---|
| 3,868,538 A | * | 2/1975 | Blanchard | 315/411 |
| 3,940,789 A | * | 2/1976 | Kratze et al. | 358/82 |
| 4,419,814 A | * | 12/1983 | Hasserjian | 29/605 |
| 4,611,151 A | | 9/1986 | Hoover et al. | 315/368 |
| 4,613,841 A | * | 9/1986 | Roberts | 336/83 |
| 4,891,564 A | | 1/1990 | Crowley | 315/382 |
| 5,430,358 A | | 7/1995 | George | 315/382 |
| 5,565,746 A | * | 10/1996 | George | 315/382 |
| 5,614,792 A | | 3/1997 | Ogishima et al. | 315/382.1 |
| 6,445,145 B1 | * | 9/2002 | Oosuga et al. | 315/382.1 |

FOREIGN PATENT DOCUMENTS

| | | |
|---|---|---|
| EP | 0183514 | 7/1991 |
| EP | 0682446 | 11/1995 |
| JP | 5-75886 | 3/1993 |

OTHER PUBLICATIONS

Sony GDM–FW900 Service Manual, G1W Chassis, 2000.

* cited by examiner

*Primary Examiner*—Don Wong
*Assistant Examiner*—Wilson Lee
(74) *Attorney, Agent, or Firm*—Joseph S. Tripoli; Harvey D. Fried; Sammy S. Henig

(57) ABSTRACT

An autotransformer steps up the output of a high voltage amplifier for applying a drive signal to the focus electrode of a CRT. A parabolic signal is obtained or generated at a deflection frequency such as the horizontal scanning frequency and is applied as an input to the amplifier. The amplifier output is coupled to a center tap of the autotransformer. One winding is serially coupled to the focus electrode and the other winding is AC coupled by a capacitor to ground, in parallel with the amplifier output. The transformer steps up the amplifier output voltage and can reduce the voltage rating required of transistors in the amplifier.

8 Claims, 2 Drawing Sheets

DYNAMIC FOCUS AMPLIFIER OUTPUT WITH STEP-UP AUTOTRANSFORMER

The invention relates to dynamic focus adjustment circuits for cathode ray tubes, particularly using an autotransformer for boosting the output voltage of a gated high voltage amplifier.

BACKGROUND

In cathode ray tubes for display or projection, one or more electron guns emit electrons that are electrostatically attracted to the phosphors on the faceplate of the cathode ray tube. The amplitude of the electron beam current is varied to vary phosphor luminance as the beam is scanned in a raster pattern by time varying magnetic fields produced by deflection coils. A beam of electrons tends to diverge, due to electrostatic repulsion. As the electrons in a CRT beam move from the cathode to the screen (anode), focusing devices associated with the electron gun cause the diverging electrons in the scanning beam to converge again at a focused point. The precise point of minimum beam diameter depends on the distance over which the converging or focusing forces operate. If the beam converges at a distance that is greater or less than the distance between the cathode and the instantaneous scanning point of the beam on the screen, the beam will be unfocused. More particularly, the beam will be wide, diffuse and incident on a larger area of the screen than it might be. The best possible resolution of the picture, which might otherwise have a pixel size as small as one phosphor dot, cannot be achieved unless the beam is focused so as to be incident on just one pixel.

The distance between the cathode and the point of minimum diameter can be considered the focal length of the focusing device. The focusing device operates in a manner that is similar to the operation of an optical lens to converge rays of light by diffraction. However, the focal length needed from the focusing device of a CRT varies during the scanning of the raster because the distance between the cathode and the screen is not constant over the area of the typical screen.

If all of the points on the screen were at equal distance from the electron gun, the screen would define a section of a sphere having an origin at the electron gun. Modern picture tube designs seek to limit the cabinet depth of a television receiver while having a relatively large display area, and the faceplates are generally very much flatter than the surface of such a sphere. The typical screen has a mild radius of curvature rather than being planar, but the radius of curvature is different from the distance between the electron gun and the screen. The typical radius of curvature is longer than the distance between the beam origin and the phosphors and not constant over the whole faceplate.

The CRT is provided with a variable focus circuit, that accommodates the difference in distance between the cathode and the screen at different points on the screen. The shortest radial distance is generally at the center of the screen. The radius is longer progressing laterally side to side, or vertically up and down, away from the center. The maximum distance is at the four corners of the display. Other layouts are possible, wherein one or more electron guns are off center.

A focus circuit applies an electrostatic voltage to converge or focus the beam at a point on the screen. The focusing forces include DC and AC components, for example using separate focus electrodes. To accommodate the difference in distance for different points on the screen, a dynamic focus voltage is also applied to vary the focal distance of the focus circuit during scanning of the raster. The required dynamic voltage is generally parabolic shaped, i.e., having a greater rate of change near the edges of the screen than in the center. In the case of an extremely wide and shallow picture tube, the difference in slope may be extreme, in which case the dynamic component may be called "bathtub shaped."

It is known to derive a parabolic voltage component for focus modulation at the horizontal scanning rate from an S-correction voltage developed in an S-shaping capacitor of a horizontal deflection output stage. It is also known how to provide a vertical rate parabola by integrating a sawtooth signal used in controlling vertical deflection. Thus, in order to drive the focus electrode(s) of the CRT, for example, a rectified DC level is obtained from the B+ voltage of the deflection power supply or from a winding of the flyback transformer, plus a horizontal rate parabola-shaped AC signal, plus a similarly shaped vertical rate parabola.

As another solution, it is known to use deflection yoke current coupled to a current transformer that is terminated by a capacitor to integrate the ramp of current representing horizontal deflection current. This provides a high voltage parabola. Such solutions, based on generating signals more or less directly from the deflection circuits, work well in some situations. However, they suppose substantially continuous signals, and do not work well, for example, in automatic kine bias (AKB) situations in which it is desirable to gate the focus signal on and off, or where the horizontal signal is otherwise something other than a continuous parabola.

U.S. Pat. No. 6,278,246—George and U.S. Pat. No. 6,118,233—Craig teach electrostatic focus circuits comprising high voltage amplifiers powered from deflection windings and operable to produce focus drive signals wherein the signals are gated on and off for AKB purposes. Gating off the dynamic focus signal at the low level during the AKB sampling interval ensures that current in the CRT is accurately sampled without contamination by internal coupling of the high voltage horizontal rate waveform. An amplifier has the advantage of facilitating such on/off gating of the dynamic focus waveform, and also provides some flexibility for optimizing the shape of the dynamic focus waveform, for example providing opportunities to shape the focus signal into a "bathtub" shape.

However, such an amplifier operates at a rather substantial voltage. These voltage levels are at the upper extremes of the range for which certain amplifier components, such as transistors, are available or will operate over a long useful life. It would be advantageous to provide a circuit having the benefits of a high voltage amplifier, but wherein there is less operational stress on the components, and less expense associated with the circuit.

For example, a design criteria for a television or other image processing device with a CRT may entail use of components that are rated for at least a given voltage or power level that is higher than the level at which such components are to be used, e.g., by some amount or proportion. The object of such design criteria might be, for example, to de-rate component parameters in order to extend the useful life of the apparatus. It is difficult or impossible, however, to employ such design criteria if the circuit design necessitates operations at the extreme of the range for which components are available.

According to an inventive aspect, the present invention reduces the need for components such as transistors, to operate at the upper extremes of available or rated voltage levels. That is, even if a component is available to operate at a given voltage level, according to the invention a lower voltage component can be used. This is accomplished by providing a step-up transformer coupled to the output of a dynamic focus amplifier, so as to increase the output voltage level while maintaining many of the other benefits associated with a high voltage amplifier type of focus drive circuit.

DESCRIPTION OF THE PREFERRED EMBODIMENTS

Figure 1:
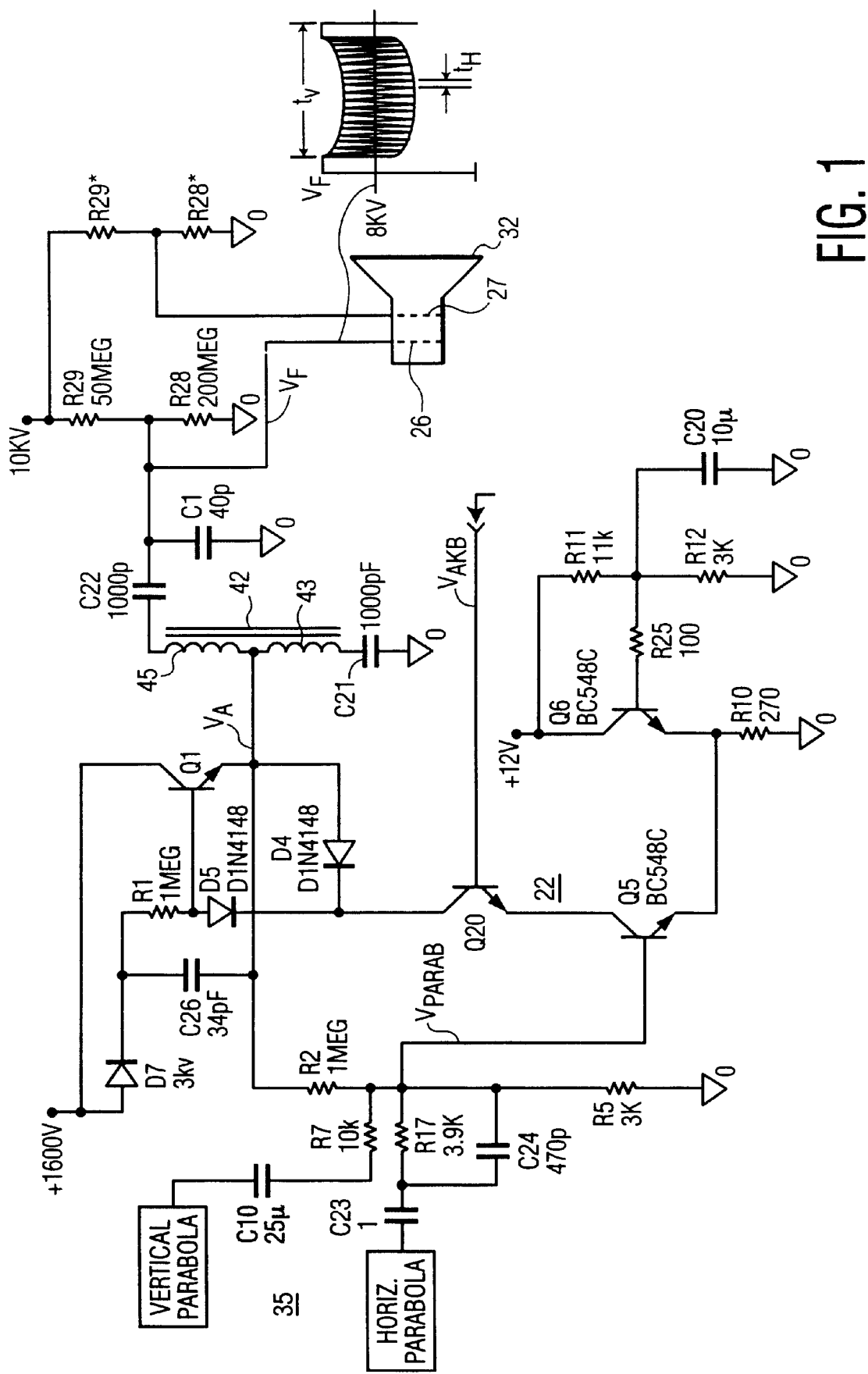
FIG. 1 is a schematic diagram generally illustrating the apparatus of the invention.

FIG. 1 illustrates a video imaging apparatus according to an inventive arrangement wherein a dynamic focus amplifier 22 operates to produce a time varying focus adjustment signal of a predetermined output amplitude $V_A$, which voltage is stepped up to a higher amplitude $V_F$, using an autotransformer 42. The higher amplitude voltage $V_F$ is applied to the dynamic focus electrode 26 of a cathode ray tube 32. A high DC voltage $V_{DC}$, is simultaneously applied to a static focus electrode 27.

The invention provides a high voltage dynamic focus signal in a manner permitting use of amplifier components that are rated for use at a lower voltage, thereby improving the longevity of the device while controlling costs.

The focus electrode 26 is driven at a parabolic voltage at a frequency related to a deflection frequency of scanning of the electron beam on the screen of the CRT 32. The input parabolic signal $V_{PARAB}$ is produced from a source 35, shown generally in FIG. 1, providing parabola components at the vertical and horizontal rates, which are summed and applied as inputs to an amplifier 22.

Various sources 35 for parabolic signals are possible. Preferably, there are components of two parabolic signals involved, namely one at the horizontal scanning frequency and one at the vertical scanning frequency. A higher amplitude horizontal variation is needed for the dynamic focus output at electrode 26, such as 1 KV peak to peak horizontal versus 300 V peak to peak vertical.

The horizontal rate source advantageously can be the voltage across an S-shaping capacitor associated with a horizontal deflection circuit. The vertical rate source likewise can be obtained from a suitable point in the vertical deflection circuits.

Insofar as the input signal to the amplifier 22 is described as a parabola, it should be appreciated that the signal is that drive signal that is necessary to account for the shape of the display screen of the CRT 32. The screen flatness and/or attributes of the circuit may be such that the optimal signal does not correspond identically to the mathematical function of a parabola as to voltage or current or power level, etc. The term "parabola" is meant to refer generally to the necessary waveshape and typically is a signal having a greater rate of change (i.e., time slope) at portions corresponding to lateral parts of the screen and a lower rate of change at portions corresponding to the central part. Thus the term also encompasses so-called bathtub shapes, wherein the difference in slope occurs somewhat more abruptly than in a smooth parabola.

The source or input "parabola" signal to amplifier 22, preferably including vertical and horizontal rate parabola voltage components, alternatively can contain a component or signal from which a parabola can be generated, such as a sawtooth current, which will yield a parabola when integrated. Thus, for example, a vertical rate sawtooth, in association with an integrator (not shown) can provide a vertical rate parabola signal. Horizontal and vertical parabola signals can be coupled to one or more inputs of the dynamic focus amplifier 22 to produce the dynamic focus signal $V_A$, having predetermined amplitude.

Advantageously, amplifier 22 can serve additional functions. The amplifier 22, for example, can have the capability of gating on and off the dynamic focus output responsive to a control signal. The control signal can be, for example, an AKB sense signal $V_{AKB}$ that gates off the dynamic focus output during a measurement interval associated with sensing the CRT current in an automatic kine bias feedback control arrangement. This function is indicated generally in FIG. 1 by AKB sense signal $V_{AKB}$, originating in known manner from a source that is not shown, for switching the dynamic focus amplifier 22 on and off via transistor Q20.

The amplifier 22 can be a cascode amplifier, coupled for AKB gating as shown in FIG. 1. Capacitor C23 AC-couples the horizontal rate parabola to high voltage cascode amplifier 22 via resistor R17. A capacitor C10 capacitively couples a vertical rate parabola from source 35 to a summing junction with the horizontal parabola at $V_{PARAB}$.

Amplifier 22 generally comprises two or more high voltage transistors responsive to the parabola input components, controlled for bias and switched from the automatic kine bias gating signal $V_{AKB}$ via transistor Q20. The direct current operating point of the focus amplifier 22 is determined by a resistor R10 and not by the input parabolic signals. The capacitive coupling at the inputs eliminates a direct current component. Capacitor C24 corrects a phase delay caused by a stray input capacitance (not shown) of amplifier 22 so that the horizontal focus correction is properly timed.

In amplifier 22, a transistor Q5 and a transistor Q6 are coupled to each other to form a differential input stage. These transistors have very high collector current-to-base current ratio, referred to as beta, to provide high input impedance at the base of transistor Q5. The base-emitter junction voltages of transistors Q5 and Q6 compensate each other and reduce direct current bias drift with temperature changes. Resistor R10 is commonly coupled to the emitters of transistors Q5, Q6. Transistor Q6 is coupled to a +12 V supply voltage. The voltage at the base of transistor Q6 is determined by a voltage divider comprising resistors R11, R12, filtered by capacitor C20 and coupled to the base of transistor Q6 by resistor R25.

The value of common emitter resistor R10, coupled to the emitters of transistors Q5 and Q6 is selected to conduct a maximum current of about 8.3 mA [2.3/270]. This protects high voltage transistor Q20, which is switched by the AKB gating signal $V_{AKB}$.

Transistor Q20 is coupled to transistor Q5 in a cascode configuration. Transistor Q20 is advantageously protected from being over-driven, because transistor Q20 typically can tolerate only up to about 10 mA collector current. This is accomplished by resistor R10 as described.

The cascode configuration of transistors Q20 and Q5 isolates Miller capacitance (not shown) across the collector-base junction of transistor Q20, providing increased bandwidth as compared to some other amplifier configurations. The cascode configuration also makes the amplifier gain independent of the low beta of high voltage transistor Q20.

The amplifier 22 is driven from a supply voltage, for example at about 1600 V, that can be derived from a stepped-up retrace voltage that is rectified and filtered for energizing amplifier 22. An active pull up transistor Q1 has a collector coupled to the 1600 V supply voltage. A base pull-up resistor R1 of transistor Q1 is coupled to the supply voltage via a bootstrap or boosting arrangement that includes a diode D7 and a capacitor C26. A diode D5 is coupled in series with resistor R1 and is coupled to the collector of transistor Q20. A diode D4 is coupled between the emitter of transistor Q1 at terminal 97a and the collector of transistor Q20.

During negative peaks from the retrace voltage source, diode D7 clamps an end terminal of capacitor C26 at the cathode of diode D7 to the +1600 V supply voltage and transistor Q20 pulls the other end terminal of capacitor C26 to near ground potential. Transistor Q1 is held off by diodes D4 and D5. As the supply voltage rises, the energy stored in capacitor C26 is fed through resistor R1 to the base of transistor Q1. The voltage across resistor R1 is maintained high, and base current in transistor Q1 also is maintained, even as the collector-to-emitter voltage across transistor Q1 approaches zero. Therefore, transistor Q1 emitter current is maintained. The output positive peak at the retrace voltage source can then be very near the +1600 V supply voltage level, without distortion.

Capacitance C1 shown in FIG. 1, represents the capacitance associated with focus electrode 26 and of the wiring. Active pull-up transistor Q1 supplies current to the centertap of autotransformer 42. Pull-down transistor Q20 likewise sinks current via diode D4, in a push-pull fashion.

Amplifier 22 drives dynamic focus electrode 26 through autotransformer 42, providing a dynamic focus voltage atop a DC bias level from the voltage divider of R28 and R29, for example 8 KV in the example shown. Additionally, a second focus electrode 27 can be provided and can have a static DC level provided by a second voltage divider R28', R29', from the same 10 KV supply.

According to an inventive aspect, autotransformer 42 is coupled between the output $V_A$ of the amplifier 22 and the focus electrode 26 of CRT 32, so as to step up the AC or dynamic focus voltage component at the output $V_A$ of amplifier 22, for driving the focus electrode 26 at a different voltage $V_F$, where the AC component at $V_F$ is at least somewhat greater than at $V_A$.

The invention has the advantageous result, among others, that the components of the amplifier 22, especially the high voltage transistors Q1 and Q20, need not operate at or be rated for the same voltage amplitude as the peak to peak amplitude of the AC component at $V_F$, namely at the focus electrode 26. The amplifier 22 can be operated at a relatively lower supply voltage (1600 V in the embodiment shown) and the peak to peak amplitude of the AC component of voltage $V_A$ (somewhat less than the 1600 V supply) is stepped up to a higher peak to peak amplitude at output voltage $V_F$ of the transformer 42, for example 2 KV. The components of amplifier 22 can be rated (or derated according to design rules intended to reduce stress) for operation at 1600 volts, while producing an output level that otherwise would require operation of amplifier 22 at 2 KV. The components of amplifier 22, such as Q1 and Q20, can be derated and actually operated at 80% of their maximum rated voltage. This improves the dependability and longevity of is the focus circuit.

In order to achieve these benefits, the transformer 42 need not substantially multiply the input voltage. In the example of 1600 V to 2 KV, the step up provided by transformer 42 is 25%. This arguably modest increase nevertheless permits the use of components in amplifier 22 that are rated for a maximum operating voltage that is lower than the peak to peak amplitude of voltage $V_A$, or allows components operable at the higher voltage to be used at a derated lower voltage, for better longevity and dependability.

The transformer 42 preferably is a center-tapped autotransformer having a plurality of windings 43, 45 coupled via a magnetic core. The center tap of the autotransformer is coupled to an output of the amplifier 22 to which the parabola signals $V_{parab}$ are applied as inputs. Two transformer windings 43, 45 are serially connected to one another at the centertap. The output of the transformer 42 is coupled to the focus electrode 26, in series with one of the windings through a series capacitor C22. The other winding is likewise AC coupled to ground through a capacitor C21. The dynamic AC focus signal at $V_F$ is summed with the static DC focus voltage from resistors R28, R29 at focus electrode 26. A static focus electrode is similarly held at a static focus voltage $V_{DC}$ by a similar voltage divider from resistors R28', R29'. Either or both of the voltage dividers R28, R29 or R28', R29', as well as the serial coupling to the voltage electrodes 26, 27, can be provided with further preferably manually adjustable resistances (not shown) for fine tuning purposes.

Figure 2:
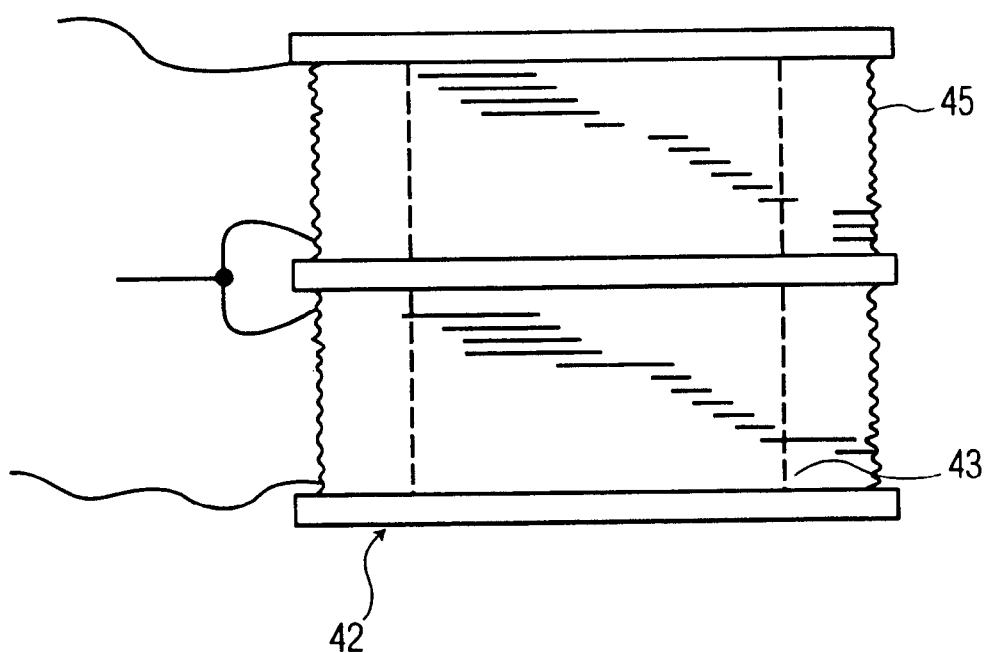
FIG. 2 is a perspective view showing a slot-wound bobbin autotransformer for use in the circuit of FIG. 1.

According to a preferred arrangement shown in FIG. 2, autotransformer 42 is specifically embodied as a slot-wound bobbin type. Autotransformer 42 steps up a dynamic focus amplifier output, for obtaining a stepped up dynamic voltage component on the focus electrode, as compared to the output of the associated amplifier 22. This higher output dynamic focus is apt, for example, on a true flat MR gun CRT (formerly known as the "Eureka" type). This type of CRT requires a greater dynamic focus range than more conventional types, such as the COTY gun CRT. Plainly both of these types, as well as other types, can benefit from the derating aspects discussed above. When using a transistor amplifier as described, it is advantageous to employ a derating rule as design criteria to achieve high reliability over a long term. Assuming, for example, that the maximum rating for the high voltage focus amplifier than can be obtained is 2 KV, and the required output is 2 KV, then derating is a problem. However, if according to the invention an autotransformer boosts the output voltage by even a modest proportion of 10% to 30% or the like, and potentially by a higher proportion, it is readily possible to achieve the necessary amplitude output while complying with a derating criterion for improving reliability or extending useful life.

According to the invention, one or more parabola signals $V_{parab}$ can be provided by any sort of low level signal generator that produces the necessary shape of signal in step with scanning. The voltage could be obtained from an available node in the deflection circuits or otherwise. Thus the source of the parabola could be, for example, the voltage on an S-capacitor, a processed version of another signal such as the output of an integrator coupled to a sawtooth current, the output of another form of parabola generator, a digitally controlled waveform generator, a "bathtub" waveform circuit, and so forth.

In a preferred arrangement parabola amplifier is a transistor amplifier capable of gating for disabling focus signal generation during AKB sensing. The high voltage cascode amplifier arrangements discussed herein are substantially similar to the cascode amplifier arrangements disclosed in U.S. Pat. Nos. 6,278,246 or 6,118,233, which lack a similar output voltage boost as provided by autotransformer 42.

The autotransformer 42 employed according to the invention can have a large number of turns and consequently a relatively high inductance, e.g., 300 to 500 mH, but need not have a high turns ratio. This is appropriate in the case of a cascode amplifier, which typically is rated for relatively high voltage but low current. According to an inventive aspect, the voltage ratings of the amplifier components, particularly transistors, can be pressed or exceeded by use of the autotransformer to boost the output voltage level. Whereas the CRT focus electrode operates substantially as an electrostatic or voltage-operative mechanism, the focus circuit functions properly nonetheless.

The autotransformer 42 preferably is driven at the center tap and the desired step-up proportion of voltage output is selected by choice of the turns ratio or number of turns for winding 45 "above" the tap, i.e., the portion of turns serially coupled between the output of the amplifier 22 and the focus electrode 26, versus the number for winding 43 below the tap, i.e., coupled in parallel with the amplifier output, to ground. The turns ratio is greater than unity, thereby boosting the voltage output ($V_F > V_A$). The winding "below" the tap is AC coupled to ground by capacitor C21 and the winding "above" the tap is AC coupled to the focus electrode 26 by capacitor C22.

If the focus circuit is used at the regular 1 H interlaced horizontal scanning frequency (approx. 15 kHz), the inductance of the autotransformer 42 can be relatively high, i.e., greater than 500 mH, to assure good reproduction at the focus electrode of the waveform at the amplifier output. For multiple-H operation, the autotransformer 42 is preferably constructed with a slotted bobbin as shown in FIG. 2, i.e., with the windings grouped in axially subdivided segments, to minimize capacitance effects which may distort the output at higher frequencies, e.g., at 2.4 H. Elongating and subdividing the autotransformer into an axially segmented slotted bobbin structure also minimizes voltage stress during high voltage operation. The autotransformer coil sections on either side of the center tap are coupled respectively to the focus electrode 26 of the CRT and to a capacitor C21 coupled to ground as mentioned above. The capacitor value is chosen to be large enough for 1 H horizontal scanning operation, but not so high as to cause charge/discharge current problems, particularly if AKB gating is used to periodically remove the influence of the focus electrode. In the preferred embodiment wherein the autotransformer is a slotted bobbin having an inductance of 300–500 mH, a capacitor value of about 470 to 1000 pF, and preferably 1000 pF, is apt.

Various changes in the details, materials, and arrangements of the parts which have been described and illustrated above to explain the nature of this invention, may be made by those skilled in the art without departing from the principle and scope of the invention as recited in the following claims.

What is claimed is:

1. A video imaging apparatus, comprising:
   a cathode ray tube including a focus electrode;
   a source of parabolic signal at a frequency related to a deflection frequency;
   an amplifier responsive to said parabolic signal, the amplifier amplifying the parabolic signal to generate a dynamic focus signal having a predetermined amplitude; and,
   an autotransformer coupled between the amplifier and the focus electrode, the autotransformer having magnetically coupled windings connected commonly and stepping up the predetermined amplitude for and driving the focus electrode.

2. The video imaging apparatus of claim 1, wherein the predetermined amplitude is a voltage amplitude and the focus electrode applies electrostatic focus effects on an electron beam of the cathode ray tube.

3. A video imaging apparatus, comprising:
   a cathode ray tube including a focus electrode;
   a source of a parabolic signal at a frequency related to a deflection frequency;
   an amplifier responsive to said parabolic signal, the amplifier amplifying the parabolic signal to generate a dynamic focus signal having a predetermined amplitude;
   an autotransformer coupled between the amplifier and the focus electrode, the autotransformer stepping up the predetermined amplitude for and driving the focus electrode;
   wherein the autotransformer is a centertapped autotransformer having a plurality of windings coupled via a magnetic core, and wherein a center tap of the autotransformer is coupled to an output of the amplifier.

4. The video imaging apparatus of claim 3, further comprising a capacitor coupled between one of the windings and ground, and wherein another of the windings is coupled in series with the focus electrode.

5. The video imaging apparatus of claim 3, further comprising a capacitor coupled in series between one of the windings and the focus electrode.

6. The video imaging apparatus of claim 3, further comprising source of a static voltage coupled to the focus electrode.

7. The video imaging apparatus of claim 3, wherein said focus electrode comprises a dynamic focus electrode and the CRT further comprises a static focus electrode wherein the dynamic focus electrode is coupled in series with one of the windings, and further comprising a static voltage source coupled to the static focus electrode.

8. The video imaging apparatus of claim 1, wherein the autotransformer comprises a slot-wound bobbin.

* * * * *